US008713216B2

(12) United States Patent
Endo et al.

(10) Patent No.: US 8,713,216 B2
(45) Date of Patent: Apr. 29, 2014

(54) PROCESSOR AND DATA TRANSFER METHOD

(75) Inventors: Kumiko Endo, Kawasaki (JP); Naoya Ishimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 299 days.

(21) Appl. No.: 12/805,193

(22) Filed: Jul. 16, 2010

(65) Prior Publication Data

US 2011/0022742 A1    Jan. 27, 2011

(30) Foreign Application Priority Data

Jul. 22, 2009  (JP) .................................. 2009-170679

(51) Int. Cl.
*G06F 13/00* (2006.01)

(52) U.S. Cl.
USPC .................................. 710/33; 710/34; 710/35

(58) Field of Classification Search
None
See application file for complete search history.

(56) References Cited

U.S. PATENT DOCUMENTS

| 4,851,993 | A | * | 7/1989 | Chen et al. ..................... 711/138 |
| 5,032,985 | A | * | 7/1991 | Curran et al. .................. 711/124 |
| 5,313,603 | A | * | 5/1994 | Takishima ..................... 711/157 |
| 5,396,597 | A | * | 3/1995 | Bodin et al. ................... 345/541 |
| 5,625,796 | A | * | 4/1997 | Kaczmarczyk et al. ....... 711/168 |
| 5,706,465 | A | * | 1/1998 | Kurokawa et al. ............. 711/123 |
| 5,765,182 | A | * | 6/1998 | Lau et al. ............................. 711/5 |
| 5,828,860 | A | * | 10/1998 | Miyaoku et al. ............... 712/207 |
| 5,857,082 | A | * | 1/1999 | Murdoch et al. .............. 710/310 |
| 6,058,267 | A | * | 5/2000 | Kanai et al. ..................... 712/28 |
| 6,148,416 | A | * | 11/2000 | Masubuchi ....................... 714/15 |
| 6,202,133 | B1 | * | 3/2001 | Jeddeloh ........................ 711/157 |
| 6,292,873 | B1 | * | 9/2001 | Keaveny et al. ............... 711/149 |
| 6,954,871 | B2 | * | 10/2005 | Kuhn ............................. 713/401 |
| 7,035,957 | B2 | * | 4/2006 | Ishiwata ........................ 710/306 |
| 7,568,031 | B2 | * | 7/2009 | Tanimoto ....................... 709/225 |
| 7,830,734 | B2 | * | 11/2010 | Faue ............................... 365/194 |
| 2001/0016885 | A1 | * | 8/2001 | Happonen ........................ 710/52 |
| 2003/0084255 | A1 | * | 5/2003 | Suzuki et al. .................. 711/150 |
| 2004/0123036 | A1 | * | 6/2004 | Hammitt et al. ............... 711/131 |
| 2004/0225840 | A1 | | 11/2004 | O'Connor et al. |
| 2004/0228540 | A1 | * | 11/2004 | Chen et al. ..................... 382/246 |
| 2006/0179213 | A1 | * | 8/2006 | Brittain et al. ................. 711/105 |
| 2007/0088903 | A1 | * | 4/2007 | Choi .............................. 711/100 |
| 2007/0174506 | A1 | * | 7/2007 | Tsuruta ........................... 710/22 |
| 2008/0098174 | A1 | * | 4/2008 | Chiba et al. ................... 711/118 |
| 2009/0300287 | A1 | * | 12/2009 | Ishimura et al. ............... 711/118 |

FOREIGN PATENT DOCUMENTS

JP    2006-522385    9/2006

OTHER PUBLICATIONS

European Search Report dated Oct. 22, 2010 in corresponding European Patent Application 10169574.0.

* cited by examiner

*Primary Examiner* — Henry Tsai
*Assistant Examiner* — Jing-Yih Shyu
(74) *Attorney, Agent, or Firm* — Fujitsu Patent Center

(57) ABSTRACT

A processor. In response to requests from a processing section, first and second memory controllers transfer first and second data items to the processing section via first and second buses, respectively. When transfers of the data items are concurrently performed via the first and second buses, one of the data items is transferred to the processing section by the buffer controller, and the other of the data items is stored in the buffer by the buffer controller. Then, after termination of transfer of the one of the data items, the other data item is transferred from the buffer to the processing section by the buffer controller.

8 Claims, 11 Drawing Sheets

PROCESSOR AND DATA TRANSFER METHOD

This application is based upon and claims the benefit of priority of the prior Japanese Patent Application No. 2009-170679, filed on Jul. 22, 2009, the entire contents of which are incorporated herein by reference.

FIELD

The embodiments discussed herein are related to a processor and a data transfer method.

BACKGROUND

In a processor, such as a CPU (Central Processing Unit) or a DSP (Digital Signal Processor), which is used in a computer, it is possible to enhance processing performance thereof by increasing its clock frequency. In recent years, however, the enhancement of the performance of the processor by increasing the clock frequency is reaching the limit. Under the circumstances, the processor tends to be multi-cored for further enhancement of the processing performance.

If the processor is multi-cored, a plurality of processor cores (hereinafter simply referred to as "the cores") are mounted as processing sections on an LSI (Large Scale Integrated circuit) chip. In the multi-cored processor, to ensure the throughput of processing, the processor is devised such that a cache memory or a main storage device is divided into a plurality of banks to access from the cores to the cache memory or the main storage device on a bank basis.

[Patent Document 1] National Publication of translated version of PCT Application No. 2006-522385

By the way, when an access is made to the cache memory divided into the banks from each core of the processor, the access is controlled by a cache memory control circuit. If the processor is provided with only one cache memory control circuit, if requests for data acquisition are simultaneously issued from the cores, the cache memory control circuit has to sequentially process the requests. Then, in some of the cores, waiting time before reading data from the cache memory becomes longer, which results in the degraded data access performance.

Therefore, to enhance the data access performance, it is envisaged to divide the cache memory into a plurality of banks and provide a plurality of cache memory control circuits in association with the respective banks, to thereby control access to the cache memory on a bank basis. By performing the access to the cache memory on a bank basis, even when requests for data acquisition are simultaneously issued from the cores, if the destinations of the requests are different banks, the cache memory control circuits can individually perform parallel processing on the respective requests at the same time. As a result, it is possible to improve the efficiency of data acquisition.

However, the parallelization of access from the cores to the cache memory causes an increase in the chip size of the LSI having the processor mounted thereon. More specifically, to enable parallel access to the cache memory, it is necessary to arrange a plurality of data buses from the cache memory to the cores, and further, in sockets for the cores, provide wiring for the data buses, and registers and selectors for receiving the wiring. This increases the chip size of the LSI having the processor mounted thereon. The increase in the chip size causes a decrease in the number of chips cut out from a piece of a silicon wafer, and an increase in the manufacturing costs of the processor.

Moreover, the number of cores which serve as processing sections within one chip tends to be increased. Therefore, an increase in the occupied area of each core is considered to have more serious influence on the increase in the chip size hereafter.

SUMMARY

According to an aspect of the invention, a processor includes a processor comprising a processing section that outputs a first request and a second request, a first memory controller that receives the first request from the processing section, a second memory controller that receives the second request from the processing section, a first memory that is connected to the first memory controller via a first bus and controlled by the first memory controller to output first data via the first bus associated with the first request, a second memory that is connected to the second memory controller via a second bus and controlled by the second memory controller to output second data via the second bus associated with the second request, and a buffer controller that includes a buffer and is connected to the first memory via the first bus and the second memory via the second bus, and transfers the first data to the processing section, and stores the second data in the buffer to transfer the second data to the processing section after termination of transferring the first data, when outputting of the first data via the first bus from the first memory and outputting of the second data via the second bus from the second memory are performed simultaneously.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

DESCRIPTION OF EMBODIMENT(S)

Figure 1:
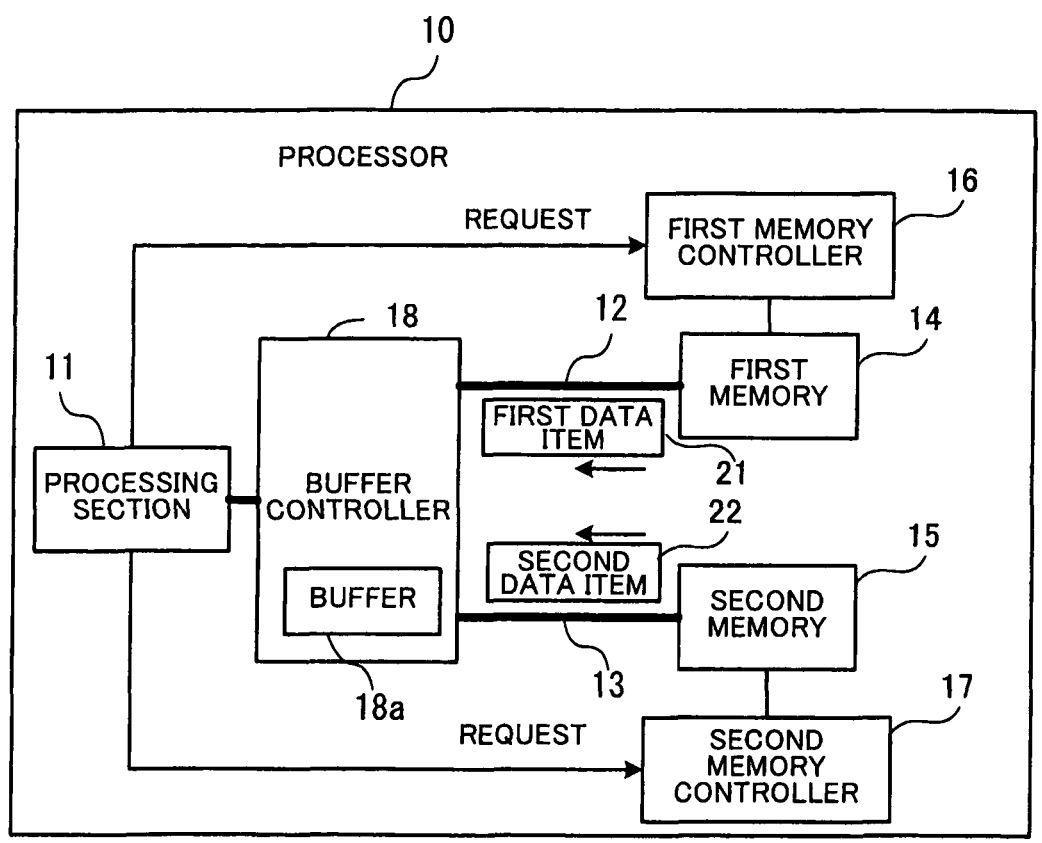
FIG. 1 illustrates a processor according to a first embodiment.

Embodiments of the present invention will be described below with reference to the accompanying drawings, wherein like reference numerals refer to like elements throughout.

FIG. 1 is a block diagram of a processor according to the first embodiment. The processor 10 comprises a processing section 11, a first bus 12, a second bus 13, a first memory 14, a second memory 15, a first memory controller 16, a second memory controller 17, and a buffer controller 18.

The processing section 11 is a processor core including a computing element etc., and performs data processing. The processor 11 requests the first memory controller 16 and the second memory controller 17 to transfer data for data processing.

The first bus 12 and the second bus 13 are used for transferring data to the processing section 11.

The first memory 14 is connected to the first bus 12. The second memory 15 is connected to the second bus 13. The connection between the first memory 14 and the first bus 12, and the connection between the second memory 15 and the second bus 13 may be indirect ones via circuits different from each other.

The first memory controller 16 is provided in a manner associated with the first bus 12, and transfers a first data item 21 requested by the processing section 11 from the first memory 14 to the processing section 11 via the associated first bus 12. The second memory controller 17 is provided in a manner associated with the second bus 13, and transfers a second data item 22 requested by the processing section 11 from the second memory 15 to the processing section 11 via the associated second bus 13.

The buffer controller 18 is connected between each of the first bus 12 and the second bus 13, and the processing section 11. When transfers of data items are concurrently performed via the first bus 12 and the second bus 13, that is, when a plurality of data items are transferred within the same time period, the buffer controller 18 transfers one of the data items to the processing section 11, and stores the other of the data items in a buffer 18a. For example, if the first data item 21 is input to the buffer controller 18 earlier than the second data item 22, the first data item 21 is transferred to the processing section 11, and the second data item 22 is stored in the buffer 18a. Then, after termination of transfer of the one data item, the buffer controller 18 transfers the other data item from the buffer 18a to the processing section 11.

According to the processor 10 configured as above, in response to a request from the processing section 11, the first data item 21 is transferred to the processing section 11 by the first memory controller 16 via the first bus 12. Further, in response to a request from the processing section 11, the second data item 22 is transferred to the processing section 11 by the second memory controller 17 via the second bus 13. When transfers of data items are concurrently performed via the first bus 12 and the second bus 13, one of the data items is transferred to the processing section 11 by the buffer controller 18, and the other of the data items is stored in the buffer 18a by the buffer controller 18. Then, after termination of transfer of the one data item, the other data item is transferred from the buffer 18a to the processing section 11 by the buffer controller 18.

This makes it possible to parallelize memory access from the processing section 11 while suppressing an increase in the chip size of the processor 10. That is, although a plurality of buses are provided for transferring data to the processing section 11, input of data to the processing section 11 from the buses can be performed via one channel. This prevents the processing section 11 from occupying a larger area. Moreover, it is possible to form the buffer controller 18 disposed between the processing section 11 and the first and second buses 12 and 13 by a smaller circuit than when the buffer control is performed within the processing section 11. This makes it possible to minimize an increase in the chip size of the whole processor 10.

The second embodiment realizes the parallelization of data access via a cache memory in a multi-core LSI (Large-Scale Integrated circuit) by minimizing an increase in the chip size of the LSI.

Figure 2:
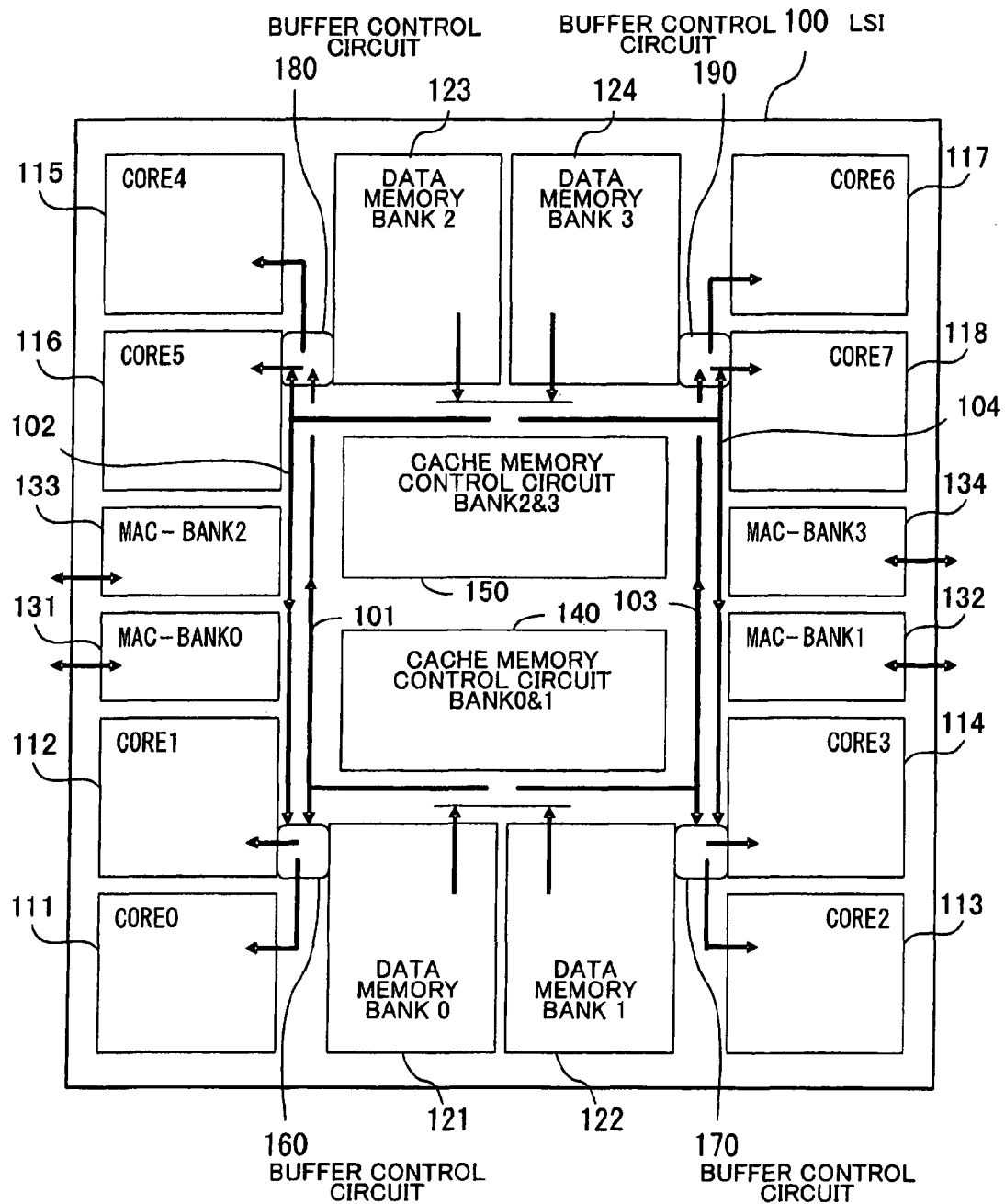
FIG. 2 illustrates an example of a circuit configuration of a processor according to a second embodiment.

FIG. 2 illustrates an example of a floor planning of a processor according to the second embodiment. An LSI 100 has a plurality of cores 111 to 118. The LSI 100 is a multi-core CPU or DSP (Digital Signal Processor), for example. In the illustrated example, the total number of the cores 111 to 118 is eight. Core identification numbers "CORE0" to "CORE7" are assigned to the respective cores 111 to 118. The cores 111 to 118 are capable of individually executing data processing.

The cache memory of the LSI 100 includes a plurality of data memories 121 to 124. Each of the data memories 121 to 124 forms a bank of the cache memory. More specifically, the cache memory is divided into four banks by the data memories 121 to 124, respectively. The banks are assigned bank identification numbers "BANK0" to "BANK5", respectively. Memory addresses (addresses of data items in main storage devices) requested by the cores 111 to 118 each have a predetermined 2-bit value indicative of a bank identification number. By referring to the predetermined 2-bit value, it is possible to determine which bank contains data requested by the cores 111 to 118. In the second embodiment, the banks are separated from each other by 2 least-significant bits of the requested memory addresses.

The data memories 121 to 124 are storage areas for temporarily storing commands and data used by the cores 111 to 118. For example, the data memories 121 to 124 store 128 bytes of data per line. The amount of data per line in the data memories 121 to 124 is called a cache block size. Data transfers via buses 101 to 104 are performed in units of cache blocks.

Further, the data memories 121 to 124 are implemented by a storage device capable of performing a read/write at a higher speed than that of the main storage devices. For example, a static RAM (Random Access Memory) is used as the data memories 121 to 124.

The data memories 121 to 124 are connected to main storage devices (not illustrated) which are externally provided in association with the banks, respectively. Accesses from the LSI 100 to the external main storage devices are performed via main storage control circuits 131 to 134 associated with the external main storage devices, respectively.

Further, the LSI 100 includes cache memory control circuits 140 and 150 for controlling input and output of data to and from the data memories 121 to 124 divided into the four banks. The two cache memory control circuits 140 and 150 each control two of the data memories. In the example illustrated in FIG. 2, the cache memory control circuit 140 controls the data memories 121 and 122, and the cache memory control circuit 150 controls the data memories 123 and 124.

Here, data transfer buses 101 to 104 connect between the data memories 121 to 124 and the cores 111 to 118. The bus 101 is used for data transfer from the data memories 121 and 122 to the cores 111, 112, 115, and 116. The bus 102 is used for data transfer from the data memories 123 and 124 to the cores 111, 112, 115, and 116. The bus 103 is used for data transfer from the data memories 121 and 122 to the cores 113, 114, 117, and 118. The bus 104 is used for data transfer from the data memories 123 and 124 to the cores 113, 114, 117, and 118.

The data transfer buses 101 to 104 have a data width of e.g. 32 bytes. In this case, if the amount of data transferred in response to a request from a core is 128 bytes, the data is transferred from the data memories 121 to 124 to the cores 111 to 118 in four cycles of the operating clock of the buses.

The cache memory control circuit 140 is connected to the data memories 121 and 122 of the cache memory corresponding to the bank identification numbers "BANK0" and "BANK1". Upon reception of a data request from any of the cores 111 to 118, the cache memory control circuit 140 determines whether or not a requested data item exists in the data memory 121 or 122. If the requested data item exists in the data memory 121 or 122, the cache memory control circuit 140 reads out the requested data item from the data memory 121 or 122, and transfers the data item to the core that have issued the data request, via the bus 101 or 103. Further, if the requested data item does not exist in the data memory 121 or 122, the cache memory control circuit 140 reads the requested data item from an associated one of the main storage devices via the main storage control circuit 131 or 132 associated therewith. The cache memory control circuit 140 stores the data item read from the main storage device, as cache data in the data memory 121 or 122, and transfers the data item to the core that has issued the data request, via the bus 101 or 103.

The cache memory control circuit 150 is connected to the data memories 123 and 124 as cache memories corresponding to the bank identification numbers "BANK2" and "BANK3". Upon reception of a data request from any of the cores 111 to 118, the cache memory control circuit 150 determines whether or not a requested data item exists in the data memory 123 or 124. If the requested data item exists in the data memory 123 or 124, the cache memory control circuit 150 reads out the requested data item from the data memory 123 or 124, and transfers the data item to the core that have issued the data request, via the bus 102 or 104. Further, if the requested data item does not exist in the data memory 123 or 124, the cache memory control circuit 150 reads the requested data item from an associated one of the main storage devices via the main storage control circuit 133 or 134 associated therewith. The cache memory control circuit 150 stores the data item read from the main storage device, as cached data in the data memory 123 or 124, and transfers the data item to the core that have issued the data request, via the bus 102 or 104.

The cache memory control circuit 140 controls the two banks of the data memories 121 and 122 and the main storage control circuits 131 and 132 using pipe lines. Similarly, the cache memory control circuit 150 controls the two banks of the data memories 123 and 124 and the main storage control circuits 133 and 134 using pipe lines. These banks are separated from each other using certain two bits of requested memory addresses, and requests from the cores are distributed and processed on a bank basis according to the addresses. When a request from a core causes a cache miss, data from one of the main storage control circuits 131 to 134 is registered in a data memory of the same bank.

Here, the two cache memory control circuits 140 and 150 operate completely independently without communicating with each other. This is to prevent a hang-up from being caused due to the mutually dependent relationship between the cache memory control circuits 140 and 150. Such an arrangement in which the cache memory control circuits 140 and 150 are independent of each other is similar to the arrangement in which the system controller LSI is formed by different LSIs on a bank-by-bank basis. Accordingly, as data buses for transferring data from the cache memory (the data memories 121 to 124) to the cores 111 to 118, the buses 101 and 103 for transferring data from "BANK0" and data from "BANK1", and the buses 102 and 104 for transferring data from "BANK2" and data from "BANK3" are provided. These buses 101 to 104 are wired independently of each other.

Buffer control circuits 160, 170, 180, and 190 control timing in which data items to be transferred to the cores 111 to 118 are input to the cores 111 to 118. Each of the buffer control circuits 160, 170, 180, and 190 is connected to two of the cores, and selectively inputs data items to one of the cores connected thereto. More specifically, the buffer control circuit 160 is connected to the cores 111 and 112. The buffer control circuit 170 is connected to the cores 113 and 114. The buffer control circuit 180 is connected to the cores 115 and 116. The buffer control circuit 190 is connected to the cores 117 and 118.

The buffer control circuits 160, 170, 180, and 190 each have a buffer. When transfer of a data item from "BANK0&1" and transfer of a data item from "BANK2&3" conflict with each other, the buffer control circuits 160, 170, 180, and 190 perform queuing control using their buffers. More specifically, when respective inputs of data items via two buses conflict with each other, an associated one of the buffer control circuits 160, 170, 180, and 190 stores one of the data items in the buffer thereof. The case where the respective inputs of data items via two buses conflict with each other is e.g. a case where data items to be transferred to the same core 111 are input approximately simultaneously from the cache memory control circuits 140 and 150 via the buses 101 and 102. In such a case, the buffer control circuit 160 connected to the core 111 transfers one of the data items to the core 111 without via the buffer, and stores the other of the data items in the buffer. After termination of the earlier transfer of the one of the data items to the core, the buffer control circuit 160 transfers the data item stored in the buffer to the core 111.

In the multi-core LSI 100 configured as above, transfers of data items to the cores 111 to 118 are controlled by the cache memory control circuits 140 and 150. In the following, a description will be given of the internal construction of the cache memory control circuits 140 and 150.

Figure 3:
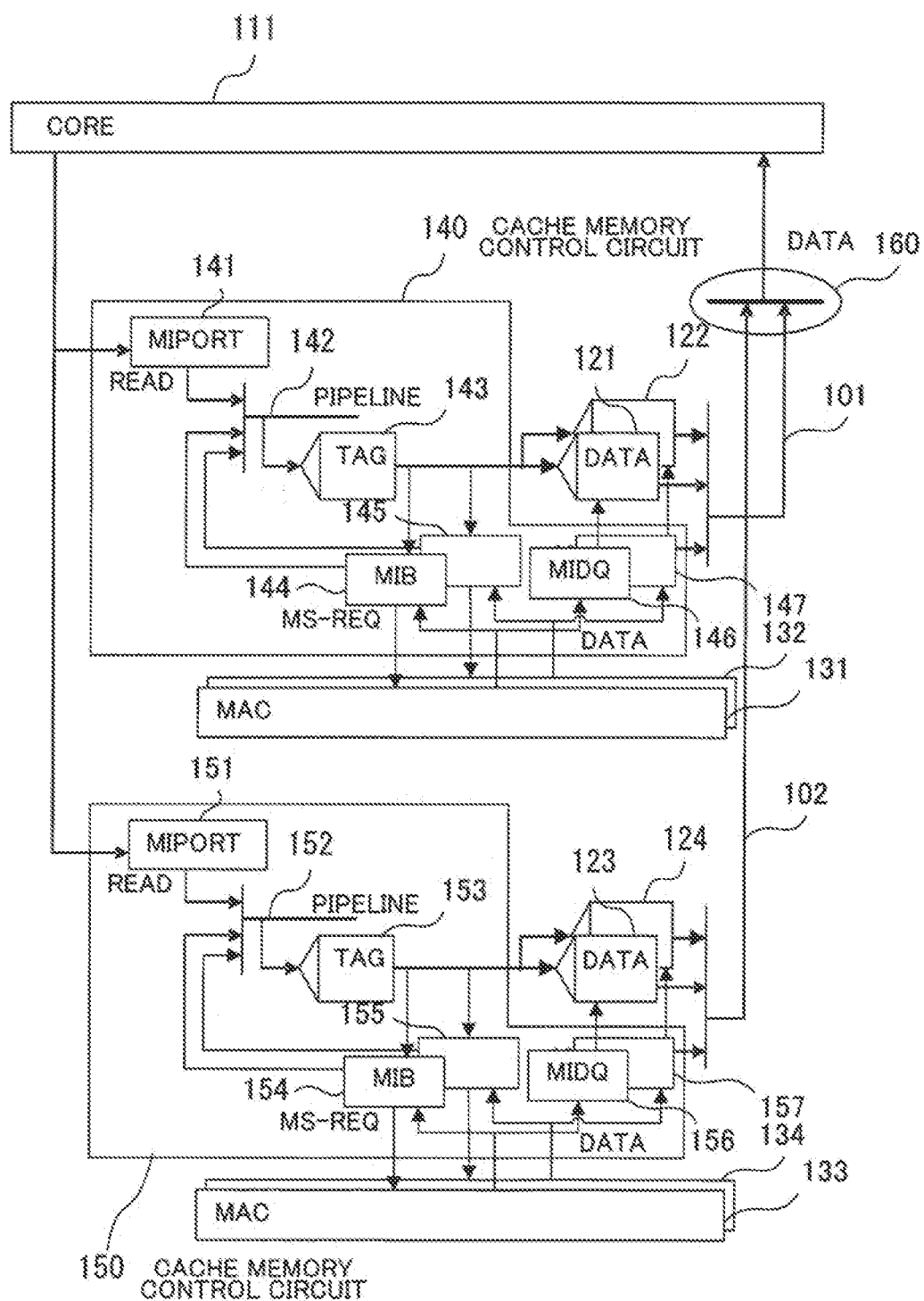
FIG. 3 illustrates the internal construction of cache memory control circuits.

FIG. 3 is a block diagram of the internal construction of the cache memory control circuits. FIG. 3 illustrates a circuit configuration for the cache memory control circuits 140 and 150 to transmit data requested by the core 111 to the core 111.

The cache memory control circuit 140 includes a move-in port (MIPORT) 141, a pipeline control circuit 142, a tag memory (TAG) 143, move-in buffers (MIBs) 144 and 145, and move-in data queues (MIDQs) 146 and 147. The move-in port 141 is connected to the core 111 by a control bus, and receives a request from the core 111. An output from the move-in port 141 is input to the pipeline control circuit 142. The pipeline control circuit 142 carries out pipeline control e.g. for reception and selection of requests and execution of tag searches. The tag memory 143 is connected to the pipeline control circuit 142. The tag memory 143 stores the tags of data items stored in the data memories 121 and 122.

Outputs from the tag memory 143 form address inputs to the data memories 121 and 122 or inputs to the move-in buffers 144 and 145. As a result of search of the tag memory 143, when a data item requested by the core 111 does not exist in the data memory 121 or 122, the move-in buffer 144 or 145 stores the memory address of the requested data item and the like. Further, the move-in buffers 144 and 145 perform control of operations until data items from the main storage devices are registered in the cache memory. The memory addresses stored in the move-in buffers 144 and 145 are output to the main storage control circuits 131 and 132 as respective memory addresses of data items to be read from the main storage devices associated therewith.

Data items output from the main storage control circuits 131 and 132 are input to the move-in buffers 144 and 145 and the move-in data queues 146 and 147. The move-in data queues 146 and 147 are for temporarily storing data items read from the main storage devices associated with the main storage control circuits 131 and 132. The move-in buffers 144 and 145 are connected to the pipeline control circuit 142. When a data item is input from the main storage control circuit 131 or 132, the move-in buffer 144 or 145 associated therewith outputs the memory address of the data item stored therein to the pipeline control circuit 142. When the move-in data queue 146 or 147 stores a data item input from the main storage control circuit 131 or 132 associated therewith, it writes the data item in the data memory 121 or 122 associated therewith and outputs the data item to the bus 101, according to an instruction from the pipeline control circuit 142.

The cache memory control circuit 150 includes a move-in port (MIPORT) 151, a pipeline control circuit 152, a tag memory (TAG) 153, move-in buffers (MIBs) 154 and 155, and move-in data queues (MIDQs) 156 and 157. Each of the elements in the cache memory control circuit 150 has the same function as that of each of the elements having the same name in the cache memory control circuit 140.

Next, a description will be given of processing carried out when a data read request is issued from the core 111 to the cache memory control circuits 140 and 150 configured as above. It is assumed that the data read request issued from the core 111 includes the memory address of a data item to be read. Further, in the following example, the data read request is assumed to designate a memory address in "BANK0".

The move-in ports 141 and 151 of the respective cache memory control circuits 140 and 150 receive requests from the core 111. The move-in port 141 receives only requests designating memory addresses in "BANK0" and "BANK1", whereas the move-in port 151 receives only requests designating memory addresses in "BANK2" and "BANK3". In the illustrated example, since the request designates a memory address corresponding to "BANK0", the move-in port 141 receives the request.

In response to the request from the core 111, the move-in port 141 starts a read process in the cache memory control circuit 140. The read process is for searching the tag memory 143 for the memory address of a data item requested by the core 111. An instruction for performing the read process is supplied to the pipeline control circuit 142. The instruction supplied to the pipeline control circuit 142 includes the memory address of the data item to be read.

The tag memory 143 stores the tags of data items stored in the data memories 121 and 122. Each tag includes a memory address and a state of a data item. The state of a data item is indicated by a flag bit indicative of whether or not the data item is valid, a flag bit indicative of whether or not the data item stored in a data memory has been rewritten after being read from a main storage device, and the like.

When the tag memory 143 contains a memory address indicated by a read instruction and at the same time a data item in a data memory associated with the memory address is valid, it is determined that the requested data item exists in cache (a cache hit). If a cache hit is detected, the address (cache address) in the data memory 121 or 122, associated with the tag of the data item including the memory address, is output from the tag memory 143. The data item output from the data memory 121 or 122 is input to the buffer control circuit 160 via the bus 101.

When the memory address of the requested data item is not contained in the tag memory 143, it is determined that the requested data item does not exist in cache (a cache miss hit). Further, also when the memory address indicated by the read instruction is contained in the tag memory 143 but the associated data item in the data memory 121 or 122 is not valid, it is determined that a cache miss is detected. If a cache miss is detected, the data item is requested of the main storage control circuit 131 via the move-in buffer 145.

The move-in buffer 145 stores the memory address of the data item to be read from the associated main storage device. The memory address stored in the move-in buffer 145 is passed to the main storage control circuit 131. Then, the main storage control circuit 131 reads out a data item associated with the memory address from the main storage device. The read data item is stored in the move-in data queue 146 by the main storage control circuit 131. The fact that the data item has been stored is transmitted to the move-in buffer 145, and a move-in request (MVIN) for requesting registration of cached data is issued from the move-in buffer 145 to the pipeline control circuit 142. This move-in request (MVIN) causes the memory address of the data item requested to the tag memory 143 to be registered therein. Further, the data item read out from the main storage device is output from the move-in data queue 146 so as to be written in the data memory 121 and be input to the buffer control circuit 160 via the bus 101. When the move-in request (MVIN) has passed through the pipeline control circuit 142 and the processing responsive to the move-in request (MVIN) is completed, the move-in buffer 145 is released. The data item input from the cache memory control circuit 140 to the buffer control circuit 160 is output to the core 111 by the buffer control circuit 160.

Although in the example illustrated in FIG. 3, a data item is transmitted to the core 111 in response to a request from the core 111, a data item can also be transferred to any of the other cores 112 to 118 via an associated one of the buses 101 to 104. In this case, the cache memory control circuit 140 or 150 notifies an associated one of the buffer control circuits 160, 170, 180, and 190 of a destination core to which the data item transmitted via the associated one of the buses 101 to 104 is to be input, via a control signal line (not illustrated). This enables the buffer control circuits 160, 170, 180, and 190 to recognize which core the data input via the bus 101 or 102 is to be transferred to.

Next, a detailed description will be given of the function of the buffer control circuit 160.

Figure 4:
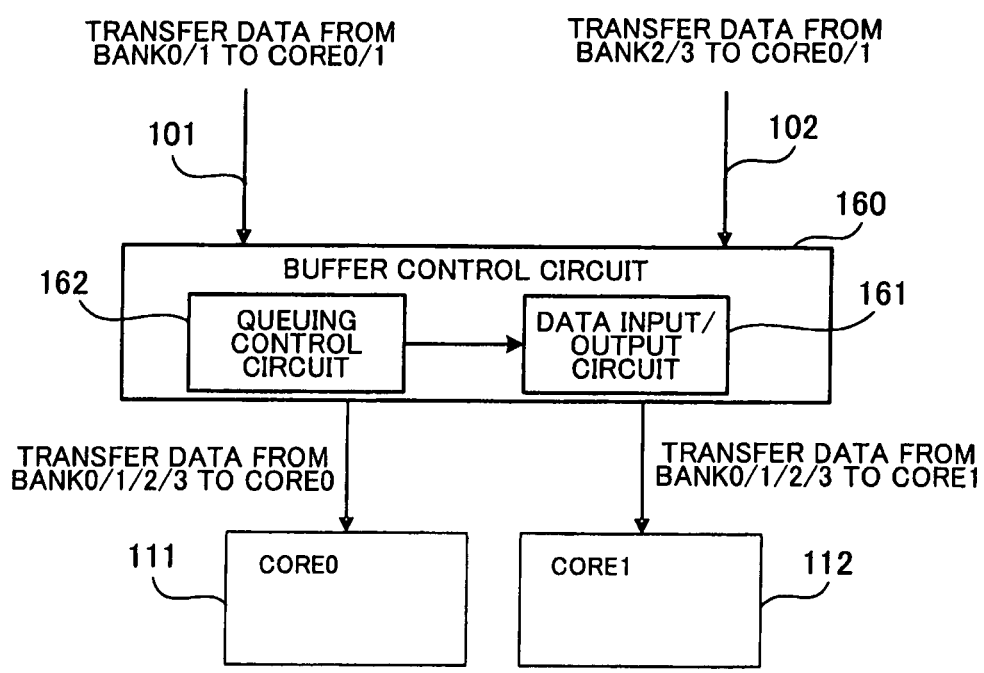
FIG. 4 illustrates the internal construction of a buffer control circuit.

FIG. 4 is a block diagram of the internal construction of the buffer control circuit. The buffer control circuit 160 includes a data input/output circuit 161 and a queuing control circuit 162.

The data input/output circuit 161 transfers a data item input via the bus 101 or 102 to the core 111 or 112 according to an instruction from the queuing control circuit 162. When the data input/output circuit 161 receives an instruction from the queuing control circuit 162 that lets the input data item be stored in the buffer, the data input/output circuit 161 stores the data item in the buffer thereof, and then transfers the data item to a designated one of the cores 111 and 112 at a predetermined timing.

When a data item is input via the bus 101 or 102, the queuing control circuit 162 determines whether the data item is to be buffered or immediately transferred to the core 111 or 112 without being buffered. The queuing control circuit 162 gives a data input/output instruction, to the data input/output circuit 161 according to the results of the determination.

Next, a detailed description will be given of the internal construction of the data input/output circuit 161.

Figure 5:
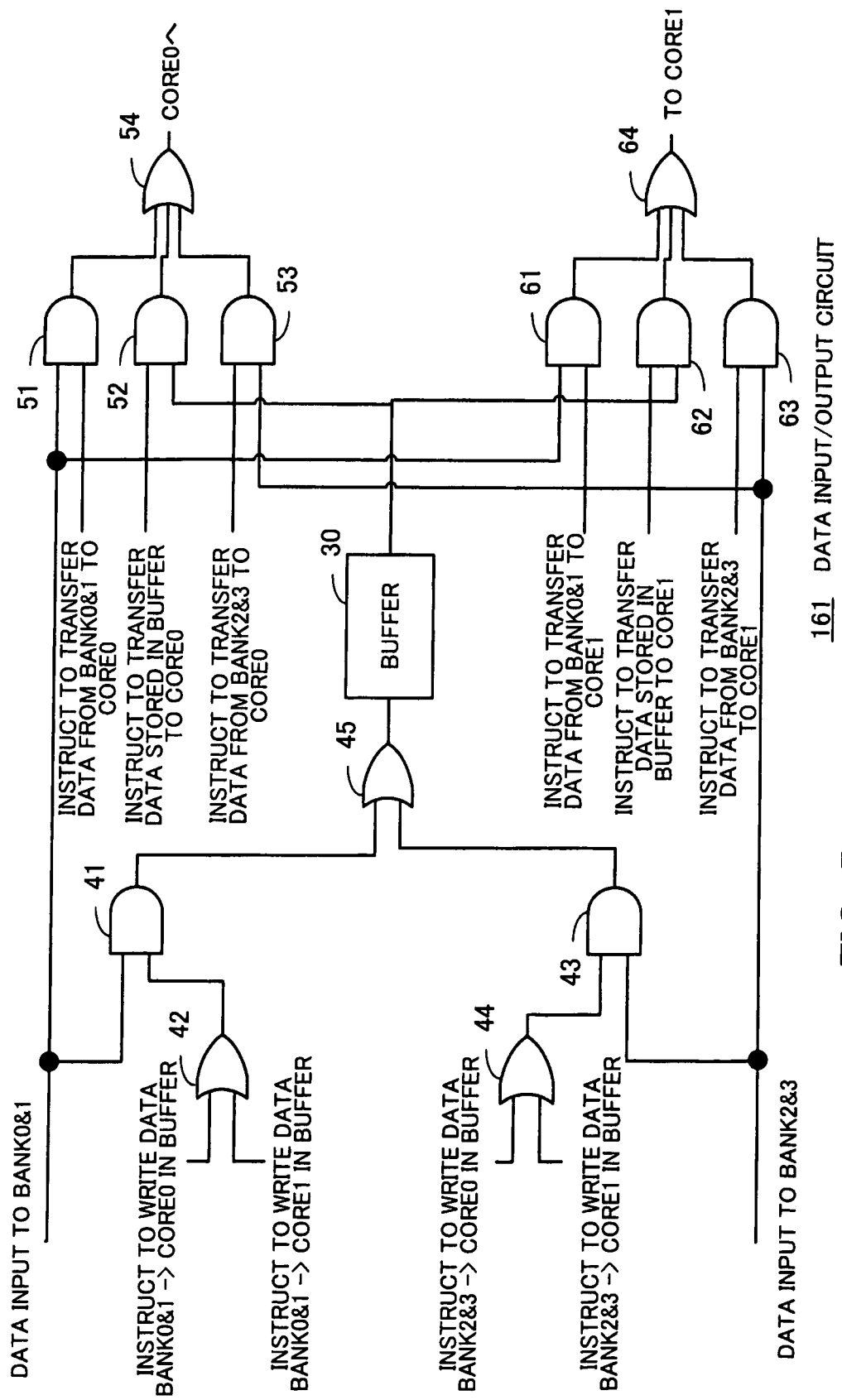
FIG. 5 illustrates the internal construction of a data input/output circuit.

FIG. 5 is a schematic diagram of the internal construction of the data input/output circuit 161. The data input/output circuit 161 has a circuit configuration for transferring a data item input from the bus 101 or 102 to the core 111 or 112, or writing the input data item in a buffer 30 and reading the data item stored in the buffer 30 to transfer the same to the core 111 or 112.

A data item from "BANK0&1" input via the bus 101 is input to three AND (logical product) circuits 41, 51, and 61. Further, an output signal from an OR circuit 42 is input to the AND circuit 41. Two control signals from the queuing control circuit 162 are input to the OR circuit 42. One of the control signals instructs to write the data item from "BANK0&1" which is to be input to the core 111, in the buffer 30. The other of the control signals instructs to write the data item from "BANK0&1" which is to be input to the core 112, in the buffer 30.

A data item from "BANK2&3" input via the bus 102 is input to three AND (logical product) circuits 43, 53, and 63. Further, an output signal from an OR circuit 44 is input to the AND circuit 43. Two control signals from the queuing control circuit 162 are input to the OR circuit 44. One of the control signals instructs to write the data item from "BANK2&3", which is to be input to the core 111, in the buffer 30. The other of the control signals instructs to write the data item from "BANK2&3", which is to be input to the core 112, in the buffer 30.

Output signals from the two AND circuits 41 and 43 are input to an OR circuit 45. An output signal from the OR circuit 45 is input to the buffer 30. The buffer 30 is a 128-byte storage area formed by a stack of four 32-byte registers, for example. An output from the buffer 30 is input to AND circuits 52 and 62.

To the AND circuit 51 is input not only a data item from the bus 101 but also a control signal from the queuing control circuit 162. This control signal instructs to transfer the data item from "BANK0&1" to the core 111. To the AND circuit 52 is input not only a data item from the buffer 30 but also a control signal from the queuing control circuit 162. This control signal instructs to transfer the data item from the buffer 30 to the core 111. To the AND circuit 53 is input not only a data item from the bus 102 but also a control signal from the queuing control circuit 162. This control signal instructs to transfer the data item from "BANK2&3" to the core 111.

Output signals from the three AND circuits 51 to 53 are input to an OR circuit 54. An output signal from the OR circuit 54 is input to the core 111.

To the AND circuit 61 is input not only a data item from the bus 101 but also a control signal from the queuing control circuit 162. This control signal instructs to transfer the data item from "BANK0&1" to the core 112. To the AND circuit 62 is input not only a data item from the buffer 30 but also a control signal from the queuing control circuit 162. This control signal instructs to transfer the data item from the buffer 30 to the core 112. To the AND circuit 63 is input not only a data item from the bus 102 but also a control signal from the queuing control circuit 162. This control signal instructs to transfer the data item from "BANK2&3" to the core 112.

Output signals from the three AND circuits 61 to 63 are input to an OR circuit 64. An output signal from the OR circuit 64 is input to the core 112.

With the circuit configuration described above, even when one of a data item from "BANK0&1" and a data item from "BANK2&3" is being transferred to one of the cores, if the other thereof is to be transferred to a different core, it is possible to transfer the other data item to the different core without via the buffer 30. Similarly, even when a data item read out from the buffer 30 is being transferred to one of the cores, if an input data item is to be transferred to a different core, it is possible to immediately transfer the input data to the different core.

The control signals appearing in FIG. 5 and indicative of various instructions are each of positive logic in which the signal is off (low-level signal) in a state where an associated instruction is not given, and is turned on when the associated instruction is given.

An instruction for data transfer is input from the queuing control circuit 162 to the data input/output circuit 161 having the circuit configuration described above, whereby data transfer is properly executed. A data transfer instruction is executed when an associated data item is input to the buffer control circuit 160 via the bus 101 or 102.

Figure 6:
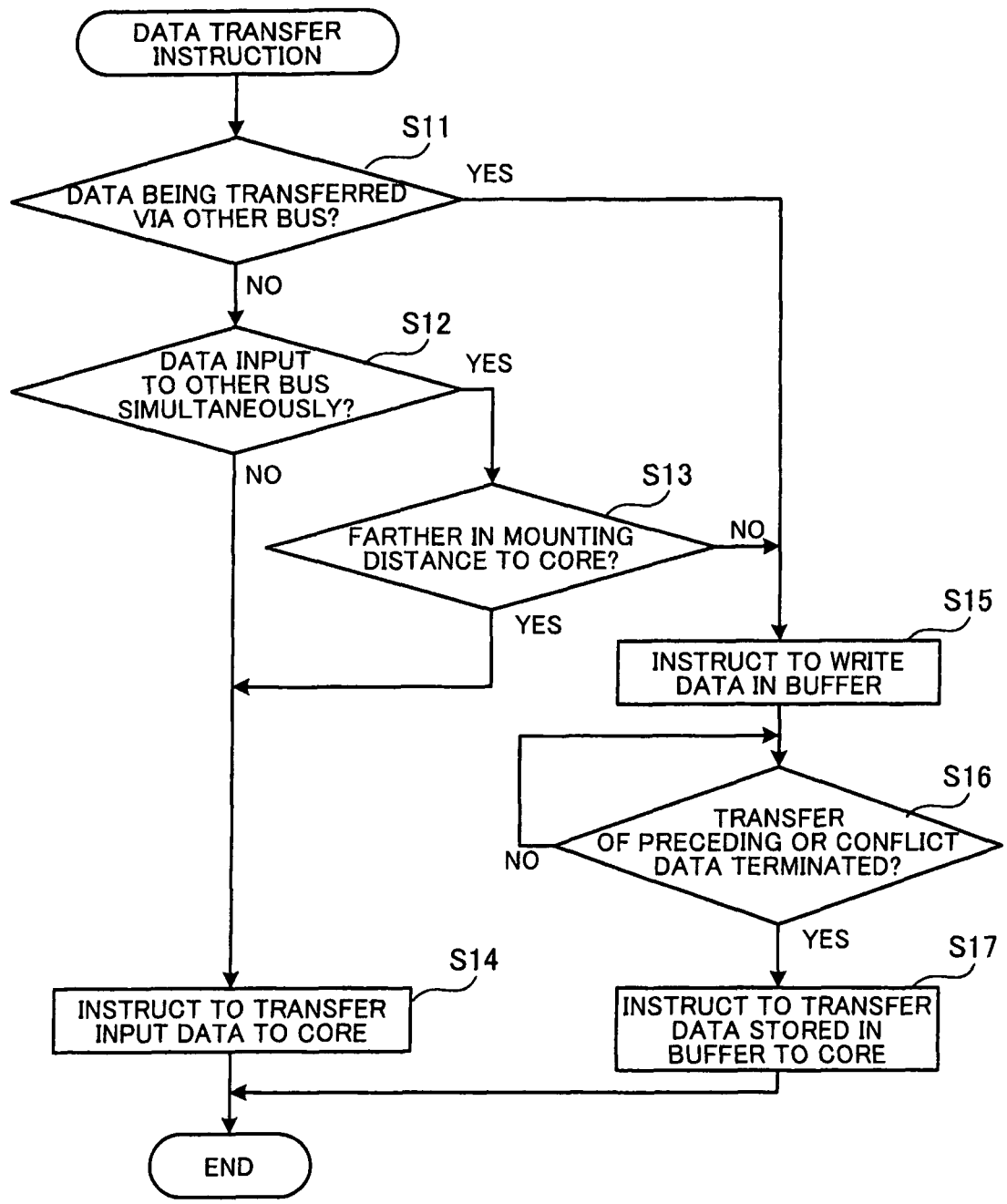
FIG. 6 is a flowchart of a data transfer instruction process executed by a queuing control circuit.

FIG. 6 is a flowchart of a data transfer instruction process executed by a queuing control circuit. This process is performed on each data item input to the bus 101 or 102 when it is input. In the following, a data item instructed to be transferred is referred to as "to-be-transferred data item", and a description will be given of the FIG. 6 process in the order of step numbers.

[Step S11] The queuing control circuit 162 determines whether or not a data item input to a bus other than a bus to which the to-be-transferred data item is input occurred earlier and the input data item is being transferred. If the data item input to the other bus is not being transferred from the other bus, the process proceeds to a step S12, whereas if the data item input to the other bus is being transferred from the other bus, the process proceeds to a step S15.

[Step S12] If the data item input to the other bus is not being transferred from the other bus, the queuing control circuit 162 determines whether or not the to-be-transferred data item and a data item from the other bus are input simultaneously. If the to-be-transferred data item and a data item from the other bus are not input simultaneously, the process proceeds to a step S14, whereas if the two data items are input simultaneously, the process proceeds to a step S13.

[Step S13] If the to-be-transferred data item and the data from the other bus are input simultaneously, the queuing control circuit 162 determines whether or not the to-be-transferred data item is to be transferred over a larger mounting distance to a core as a transfer destination than the data item input from the other bus is. Here, the mounting distance is the distance of a transfer path through which passes a signal propagating between a core and a data memory in the LSI 100. In the second embodiment, priority is given to data transfer from a data memory farther in the mounting distance. Therefore, if the to-be-transferred data item is farther in the mounting distance, the process proceeds to the step S14. If the to-be-transferred data item is closer in the mounting distance, the process proceeds to the step S15.

[Step S14] The queuing control circuit 162 gives to the data input/output circuit 161 an instruction for transferring the to-be-transferred data item from the bus having the to-be-transferred data item input thereto to the core as a transfer destination, followed by terminating the present process.

[Step S15] The queuing control circuit 162 gives an instruction for writing the to-be-transferred data item in the buffer 30, to the data input/output circuit 161. At this time, the queuing control circuit 162 stores information indicative of the transfer destination of the data item written in the buffer 30 e.g. in a register or a latch circuit within the queuing control circuit 162.

[Step S16] The queuing control circuit 162 determines whether or not transfer of the data which has been input earlier than the to-be-transferred data item or transfer of data (conflicting data) which has been input to a bus other than the bus having the to-be-transferred data item input thereto simultaneously with the input of the to-be-transferred data item has been completed. If the transfer has not been completed, the step S16 is repeatedly carried out. If the transfer has been completed, the process proceeds to a step S17.

[Step S17] The queuing control circuit 162 gives an instruction for transfer of a data item in the buffer 30 to the destination core, to the data input/output circuit 161. The transfer destination of the data item is determined based on the information stored in the step S15.

As described above, the queuing control circuit 162 gives an instruction to the data input/output circuit 161, whereby even when data items are transmitted from the two cache memory control circuits 140 and 150 to one core at the same time, it is possible to sequentially input the data items to the core.

Figure 7:
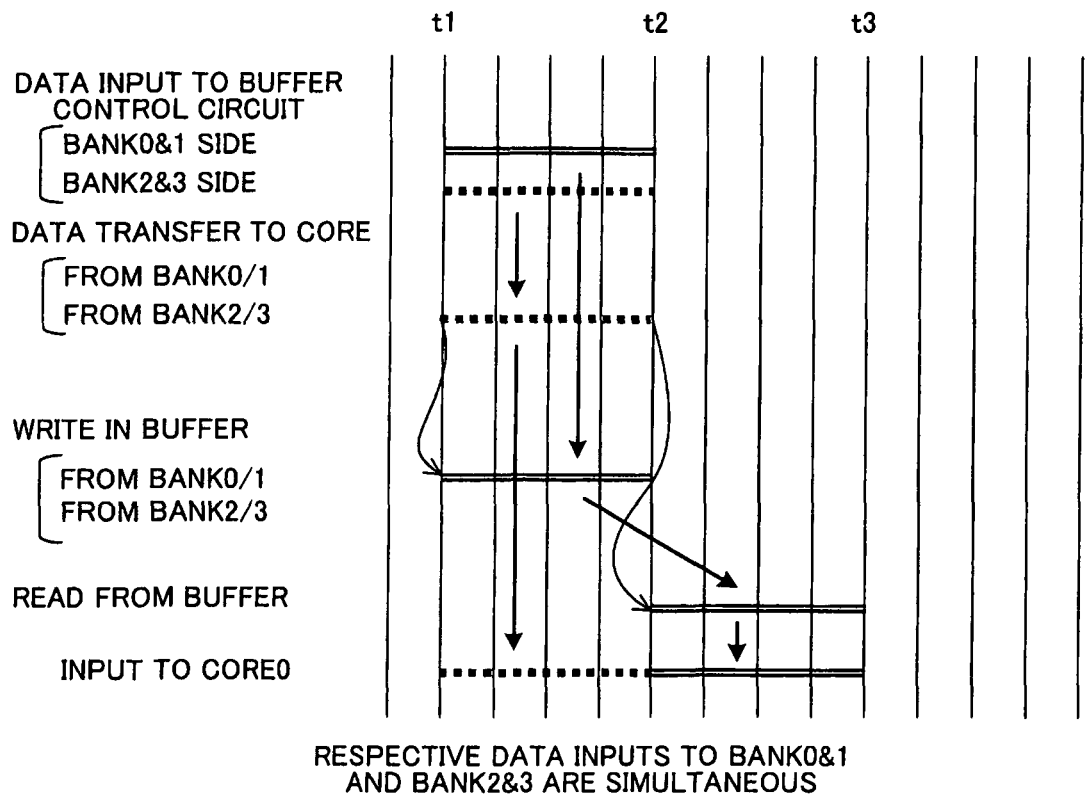
FIG. 7 is a sequence diagram of data input/output performed when data input from "BANK0&1" and data input from "BANK2&3" are simultaneously performed.

FIG. 7 is a sequence diagram of data input/output performed when a data item on a "BANK0&1"side and a data item on a "BANK2&3" side are input simultaneously. In the illustrated example, it is assumed that the transmission destinations of the two input data items are both the core 111 having the core identification number of "CORED". In FIG. 7, intervals between vertical lines correspond to the time of one cycle of the operating clock of the buses 101 and 102.

At time t1, the data item on the "BANK0&1" side is input to the buffer control circuit 160 via the bus 101. At the same time, the data item on the "BANK2&3" side is input to the buffer control circuit 160 via the bus 102. As illustrated in FIG. 2, the data memories 123 and 124 corresponding to "BANK2&3" are farther in the mounting distance to the core 111.

Therefore, at the time t1, the queuing control circuit 162 gives to the data input/output circuit 161 a transfer instruction for instructing transfer of the data item from "BANK2&3" to the core 111. That is, the queuing control circuit 162 turns on the control signal to be input to the AND circuit 53. Thus, the data item on the "BANK2&3" side is preferentially transferred to the core 111 via the AND circuit 53 and the OR circuit 54 (without being queued).

Further, at the time t1, the transfer of the data item on the "BANK2&3" side is being executed ("BANK2&3" has become busy), whereby the queuing control circuit 162 instructs the data input/output circuit 161 to write the data item from "BANK0&1" in the buffer 30. That is, the queuing control circuit 162 turns on one of the control signals to be input to the OR circuit 42. Thus, the data item on the "BANK0&1" side is written in the buffer 30 via the OR circuit 42, the AND circuit 41, and the OR circuit 45.

At time t2 when a time period of four cycles has elapsed after the time t1, the transfer of the data item on the "BANK2&3" side to the core 111 is completed (the busy state of "BANK2&3" is released). Then, the queuing control circuit 162 instructs the data input/output circuit 161 to transfer the data item in the buffer 30 to the core 111. That is, the queuing control circuit 162 turns on the control signal being input to the AND circuit 52. As a result, the data item on the "BANK0&1" side having been stored in the buffer 30 is transferred to the core 111 via the AND circuit 52 and the OR circuit 54. Then, at time t3 when the time period of four cycles has elapsed after the time t2, the transfer of the data item on the "BANK0&1" side to the core 111 is completed.

As described above, in the case where the data item from "BANK0&1" and the data item from "BANK2&3" are input at the same time, the data item from "BANK2&3"farther from the core 111 having the core identification number "CORE0" is directly transferred without being queued. Further, the data item to "BANK0&1" closer from the core 111 having the core identification number "CORE0"is written in the buffer 30. As a result, the data items which are input to the buses 101 and 102 at the same time are input to the core 111 in the order of the data on the "BANK2&3" side and the data on the "BANK0&1" side.

Figure 8:
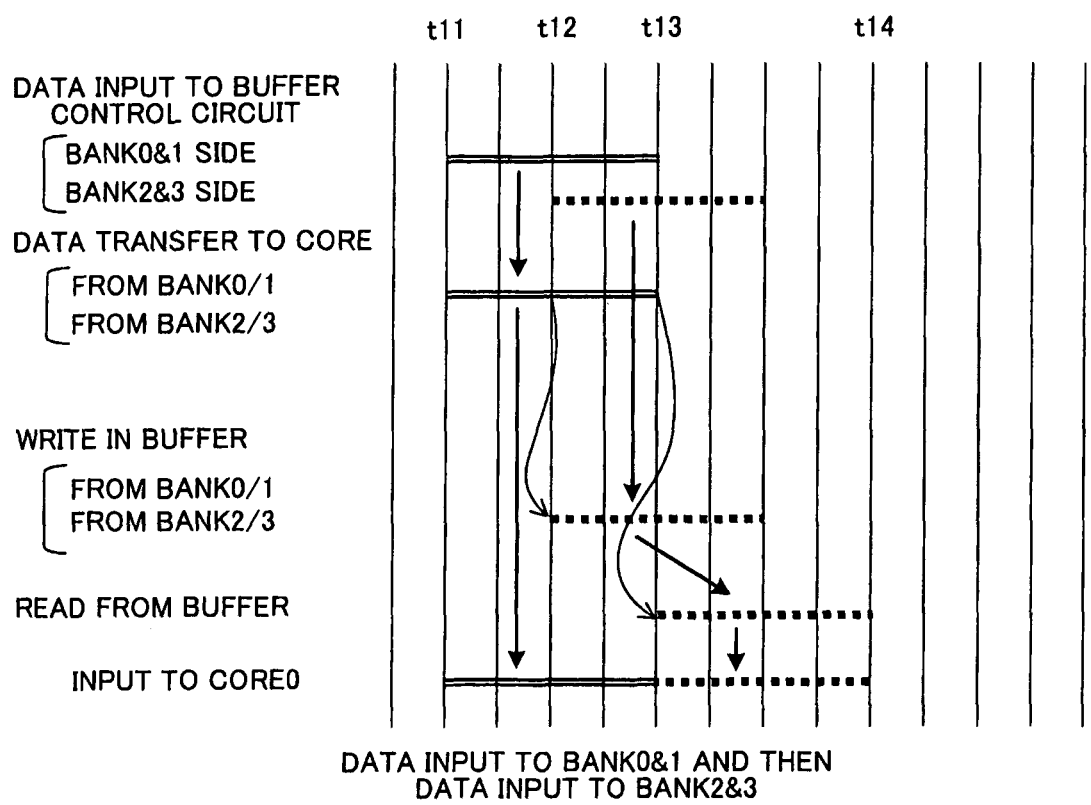
FIG. 8 is a sequence diagram of data input/output performed when data input from "BANK2&3" is performed in succession to data input from "BANK0&1"

FIG. 8 is a sequence diagram of data input/output performed when a data item from "BANK2&3" is input in succession to the input of a data item from "BANK0&1". In the illustrated example, it is assumed that the transmission destinations of the two input data are both the core 111 having the core identification number of "CORE0". In FIG. 8, intervals between vertical lines correspond to a time period of one cycle of the operating clock of the buses 101 and 102.

At time t11, an data item on the "BANK0&1" side is input to the buffer control circuit 160 via the bus 101, so that at the time t11, the queuing control circuit 162 gives to the data input/output circuit 161a transfer instruction for instructing transfer of the data item to "BANK0&1" to the core 111. That is, the queuing control circuit 162 turns on the control signal being input to the AND circuit 51. Thus, the data item on the "BANK0&1" side starts to be transferred to the core 111 without being queued, via the AND circuit 51 and the OR circuit 54. This data transfer takes the time period of four cycles of the operating clock.

At time t12 when a time period of two cycles has elapsed after the time t11, the data item on the "BANK2&3"side is input to the buffer control circuit 160 via the bus 102. At this time point, transfer of the data item on the "BANK0&1" side is being executed ("BANK0&1" has become busy), and hence at the time t12, the queuing control circuit 162 instructs the data input/output circuit 161 to write the data item on the "BANK2&3" side in the buffer 30. That is, the queuing control circuit 162 turns on one of the control signals input to the OR circuit 44. Thus, the data item on the "BANK2&3" side is written in the buffer 30 via the OR circuit 44, the AND circuit 43, and the OR circuit 45.

At time t13 when the time period of four cycles has elapsed after the time t11, the transfer of the data item on the "BANK0&1" side to the core 111 is completed (the busy state of "BANK0&1" is released). Then, the queuing control circuit 162 instructs the data input/output circuit 161 to transfer the data item in the buffer 30 to the core 111. That is, the queuing control circuit 162 turns on the control signal being input to the AND circuit 52. As a result, the data item on the "BANK2&3" side having been stored in the buffer 30 is transferred to the core 111 via the AND circuit 52 and the OR circuit 54. Then, at time t14 when the time period of four cycles has elapsed after the time t13, the transfer of the data item on the "BANK2&3" side to the core 111 is completed.

As described above, after transfer of the data item on the "BANK0&1" side to the core 111 in the four cycles of the operating clock of the buses 101 and 102, the data item from "BANK2&3" having been stored in the buffer 30 is read in the four cycles, and at the same time transferred to the core 111. That is, if the transfer of a data item conflicts with the transfer of another data item, one that arrives later is written in the buffer 30.

As illustrated in FIGS. 7 and 8, when a simultaneous conflict or a delayed conflict occurs between a data item from "BANK0&1" and a data item from "BANK2&3", they can be transferred to a destination core via two channels even if an interface provided for the core is one channel.

The storage capacity of the buffer 30 has one cache block size (the amount of data transferred in response to a data request signal). Even when data transfers using the buses 101 and 102 continuously occur, it is possible to properly perform buffer control by the buffer 30 having the storage capacity having one cache block size.

Figure 9:
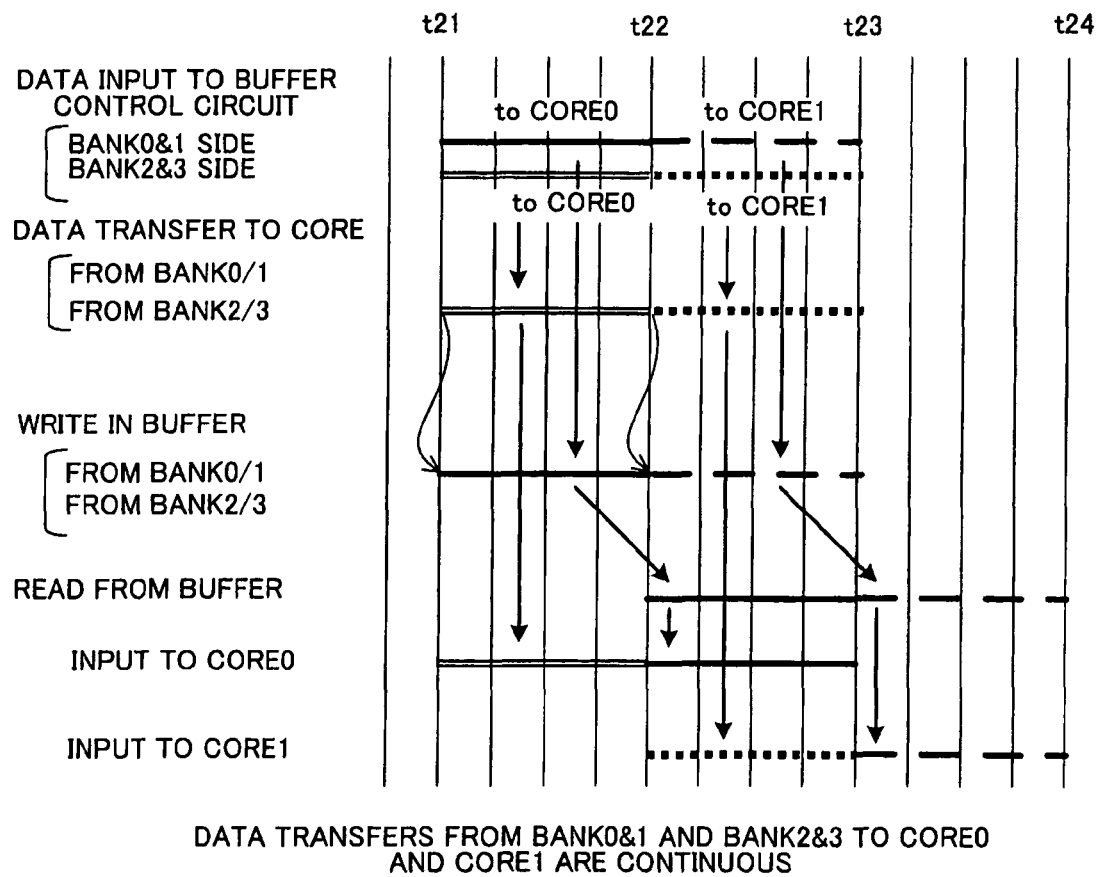
FIG. 9 is a sequence diagram of data input/output performed when data transfers from "BANK0&1"and "BANK2&3" to "CORE0" and "CORE1" are continuously performed.

FIG. 9 is a sequence diagram of data input/output performed when data items from "BANK0&1" and "BANK2&3" are continuously transferred to "CORE0" and "CORE1". In FIG. 9, intervals between vertical lines correspond to the time period of one cycle of the operating clock of the buses 101 and 102.

At time t21, a data item to be transmitted from the "BANK0&1" side to the "CORE0" is input to the buffer control circuit 160 via the bus 101. At the same time, a data item to be transmitted from the "BANK2&3" side to the "CORE0" is input to the buffer control circuit 160 via the bus 102. A procedure for transfer of these data items is as illustrated in FIG. 7.

In the example illustrated in FIG. 9, at time t22 when the time period of four cycles has elapsed after the time t21, a data item to be transmitted from the "BANK0&1" side to the "CORE1" is input to the buffer control circuit 160 via the bus 101. At the same time, a data item to be transmitted from the "BANK2&3" side to the "CORE1" is input to the buffer control circuit 160 via the bus 102.

At the time t22, the queuing control circuit 162 instructs the data input/output circuit 161 to transfer the data item on the "BANK2&3" side to the core 112. That is, the queuing control circuit 162 turns on the control signal being input to the AND circuit 63. Thus, the data item on the "BANK2&3" side is preferentially transferred to the core 112 (without being queued), via the AND circuit 63 and the OR circuit 64. At the same time, a data item to be transmitted from the "BANK0&1" side to the "CORE0" is transferred from the buffer 30 to the core 111. The transfer of the data item from the buffer 30 to the core 111 is performed via the AND circuit 53 and the OR circuit 54, and hence a transfer path for transferring the data item from the buffer 30 to the core 111 does not overlap a transfer path for transferring the data item on the "BANK2&3" side to the core 112. This makes it possible to transfer the data items to the two cores 111 and 112 in parallel.

Further, at the time t22, the data transfer on the "BANK2&3" side is being executed ("BANK2&3" has become busy), whereby the queuing control circuit 162 instructs the data input/output circuit 161 to write the data item on the "BANK0&1" side in the buffer 30. That is, the queuing control circuit 162 turns on one of the control signals being input to the OR circuit 42. This causes the data item on the "BANK0&1" side to be written in the buffer 30 via the OR circuit 42, the AND circuit 41, and the OR circuit 45.

Here, in the example illustrated in FIG. 9, the storage capacity of the buffer 30 is 128 bytes, and the amount of data transferred in response to a request (move-in request) for transfer of a data item from the cache memory to the core is 128 bytes. Further, the amount of data transferred in each cycle of the operating clock is 32 bytes. Then, 32 bytes of data is transferred from the buffer 30 to the core 111 in one cycle from the time t22, whereby an available area corresponding to 32 bytes is produced in the buffer 30. In the available area, 32-byte data as a leading portion of the data item on the "BANK0&1" side is stored in one cycle from the time t22. After that, output of 32-byte data from the buffer 30, and input of 32-byte data to the buffer 30 are repeatedly performed in each cycle of the operating clock. Thus, only if the buffer 30 has a storage capacity equal in size to the amount of data transferred per one cycle, even when continuous data transfer as illustrated in FIG. 9 occurs, it is possible to prevent occurrence of waiting for writing in the buffer 30.

At time t23 when the time period of four cycles has elapsed after the time t22, the transfer of the data item on the "BANK2&3" side to the core 112 is completed (the busy state of "BANK2&3" is released). Then, the queuing control circuit 162 instructs the data input/output circuit 161 to transfer the data item in the buffer 30 to the core 112. That is, the queuing control circuit 162 turns on the control signal being input to the AND circuit 62. As a result, the data item on the "BANK0&1" side having been stored in the buffer 30 is transferred to the core 112 via the AND circuit 62 and the OR circuit 64. Then, at time t24 when the time period of four cycles has elapsed after the time t23, the transfer of the data item on the "BANK0&1" side to the core 112 is completed.

As described above, transfer data items simultaneously input to the buses 101 and 102 are sequentially input to the cores 111 and 112 in the order of the data item on the "BANK2&3" side and the data item on the "BANK0&1" side.

As illustrated in FIG. 9, in the case where data items are continuously transferred from the "BANK0&1" side to the core 111 having the core identification number of the "CORE0" and the core 112 having the core identification number of the "CORE1", and from the "BANK2&3" side to the core 111 and the core 112, queuing of data transfer is performed. One of the data items written in the buffer 30 by the queuing is transferred to a core as a transmission destination when the transfer of the other of them to the transmission destination has been terminated. Even when the buffer control circuit 160 is shared by the two cores 111 and 112, as described above, one cache block size is sufficient for the storage capacity of the buffer 30. Furthermore, there occur no large number of queued data items in spite of sharing of the buffer control circuit 160 between the cores 111 and 112.

Further, writing of data in the buffer 30 is enabled only during the time period of four cycles taken to transfer the data in response to a case where a simultaneous conflict occurs between the data items, as illustrated in FIG. 7, or a case where a delayed conflict occurs therebetween, as illustrated in FIG. 8. Reading of a data item from the buffer 30 is enabled only during the time period of four cycles, after the completion of transfer of a data item which is farther from a destination core and hence is preferentially transferred in the case of the simultaneous conflict, or after the completion of transfer of preceding data in the case of the delayed conflict. Portions of the data item are read in an order in which they are written in the buffer 30, and are transferred to the core. In short, the data is read from the buffer 30 on a FIFO (First In First Out) basis.

Moreover, as illustrated in FIG. 5, the reading circuit and the writing circuit of the buffer 30 are separate, and hence it is not necessary to wait for all of 128 bytes of data to be stored in the buffer 30. Further, even if the reading and the writing of data are performed at the same time, there is no mixing or replacing of data.

By the way, in the example illustrated in FIG. 9, the transmission destination of a first data item on the "BANK0&1" side and that of a first data item on the "BANK2&3" side are both the core 111 ("CORE0"), and the transmission destinations of second data items thereof are both the core 112 ("CORE1"). Therefore, it is only required that the buffer 30 has a storage capacity equal to the amount of data transferred in response to a data request (move-in request). If there can occur a situation in which all the transfer destinations of the four data items appearing in FIG. 9 are the same core 111, it can be configured to cause the buffer 30 to have in advance a storage capacity at least twice as large as the amount of data transferred in response to each request. However, an increase in the storage capacity of the buffer 30 leads to an increase in the area of the LSI 100. To avoid this problem, in the second embodiment, receiving of continuous requests from the same core is limited in the cache memory control circuits 140 and 150. This makes it possible to suppress the storage capacity of the buffer 30. A time period over which the receiving of continuous requests from the same core is limited is set at least to a time period taken to transfer data items from a cache memory controller to a core (a time period over which the associated buses are occupied), for example. In the present embodiment, a time period obtained by multiplying the time period taken to transfer a data item from the cache memory controller to a core by the number of buses connected to each buffer control circuit is set to the time period over which the receiving of continuous requests from the same core is limited. More specifically, since each data item is transferred in four cycles, and two buses are connected to each buffer control circuit, the limiting time period is eight cycles. By providing the limiting time period of eight cycles, it is possible to avoid a situation in which a data item input to a bus cannot be either directly transferred to the core or stored in the buffer 30.

Further, as illustrated in FIG. 2, the buses 101 and 102 are shared for transferring data to the cores 111, 112, 115, and 116. To this end, the cores 111, 112, 115, and 116 sharing the buses 101 and 102 are grouped into one group. Similarly, the buses 103 and 104 are shared for transferring data to the cores 113, 114, 117, and 118. To this end, the cores 113, 114, 117, and 118 sharing the buses 103 and 104 are grouped into one group. Further, the cache memory control circuits 140 and 150 limit the number of times of transmission of a data item to the same group to one within a time period taken to transfer the data item (a time period over which the associated buses are occupied). In the present embodiment, the number of times of transmission of data is limited to one for every four cycles. This prevents conflict of data transfers on the buses 101 to 104.

Figure 10:
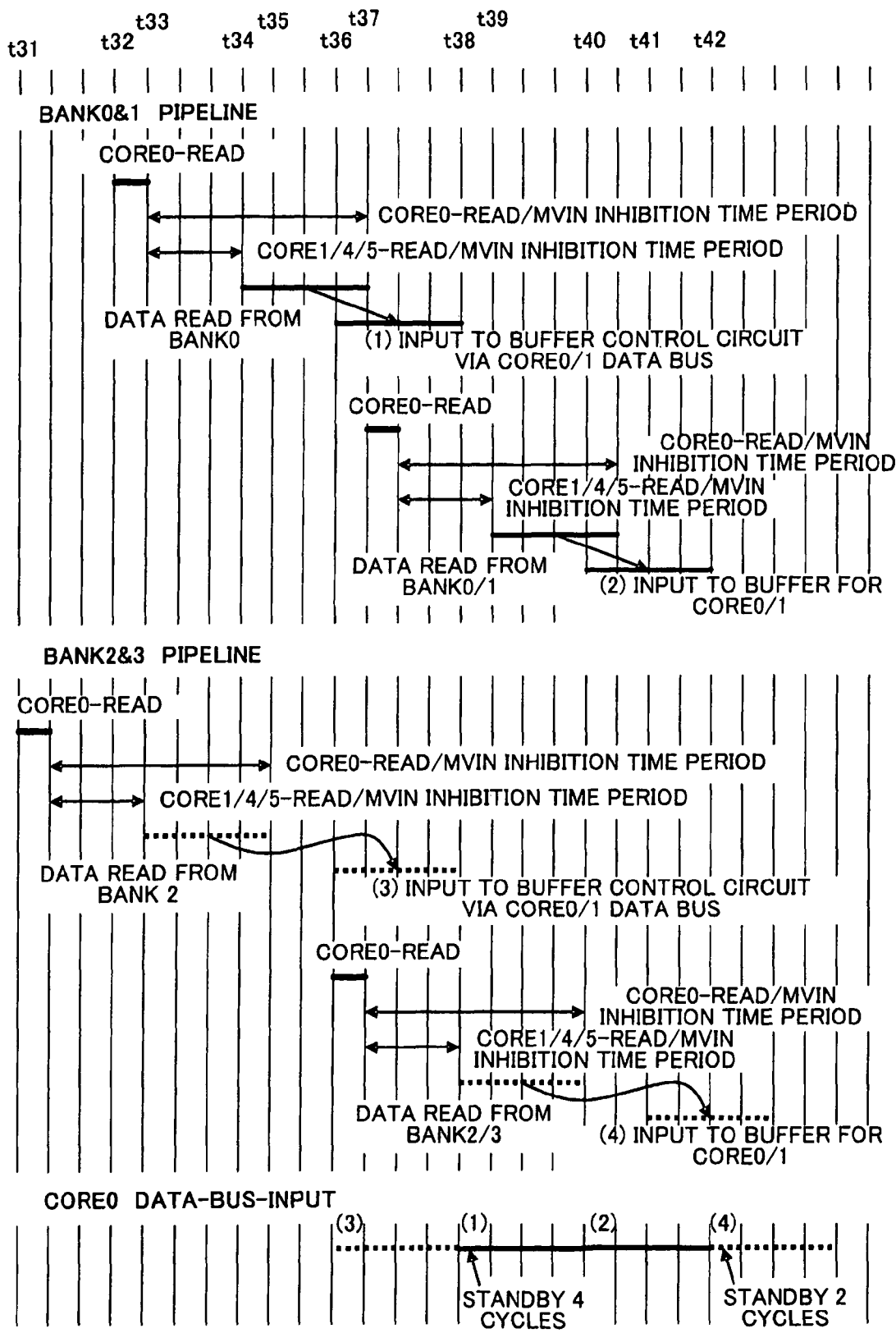
FIG. 10 is a sequence diagram of processing performed when data items are transferred from a plurality of cache memory control circuits to the same core.

FIG. 10 is a sequence diagram of processing performed when data items are transferred from a plurality of cache memory control circuits to the same core. FIG. 10 illustrates a pipeline process carried out by the cache memory control circuits 140 and 150, and an example of operations performed by the cache memory control circuits and the buffer control circuits. The cache memory control circuits 140 and 150 limit the number of times of transmission of data items to the same core to one for every eight cycles. Further, the cache memory control circuits 140 and 150 group the cores 111, 112, 115, and 116 into one group, while grouping the cores 113, 114, 117, and 118 into one group, and limit the number of times of transmission of a data item to any core of the same group to one for every four cycles.

Since the two cache memory control circuits 140 and 150 operate independently of each other, a data item on the "BANK0&1" side and a data item on the "BANK2&3" side sometimes conflict with each other. If the data items conflict, it is only required to cause one of them to queue in the buffer 30. Further, the transfer distance between "BANK2&3" and "CORE0" is longer than the transfer distance between "BANK0&1" and "CORE0". This makes the transfer latency of the former three cycles larger than that of the latter.

In the example illustrated in FIG. 10, at time t31, the core 111 gives a request (READ) for reading a data item in "BANK2". Then, the cache memory control circuit 150 inhibits supplying another data read request (READ) from the core 111 and a move-in request (MVIN) for registering cached data, to the pipeline control circuit 152, until the time of eight cycles elapses after the time T31. Further, the cache memory control circuit 150 inhibits supplying a request (READ/MVIN) from the other cores 112, 115, and 116 which belong to the same group as the core 111, to the pipeline control circuit 152, until the time period of four cycles elapses after the time T31.

At time t32, the core 111 gives a request (READ) for reading a data item in "BANK0". Then, the cache memory control circuit 140 inhibits supplying another data read request (READ) from the core 111 and a move-in request (MVIN) for registering cached data, to the pipeline control circuit 142, until the time of eight cycles elapses after the time T31. Further, the cache memory control circuit 140 inhibits supplying a request (READ/MVIN) from the other cores 112, 115, and 116 which belong to the same group as the core 111, to the pipeline control circuit 142, until the time period of four cycles has elapsed after the time T31.

The cache memory control circuit 150 reads the data item from the data memory 123 in four cycles after time t33. The read data is transferred via the bus 102 in six cycles, and is input to the buffer control circuit 160 in four cycles after the time t36. The input data is output to the core 111 without delay.

The cache memory control circuit 140 reads the data item from the data memory 121 in four cycles after time t34. The read data is transferred by the bus 101 in three cycles, and is input to the buffer control circuit 160 in four cycles after time t36.

Here, the data input from the cache memory control circuit 140 to the buffer control circuit 160, and the data input from the cache memory control circuit 150 to the buffer control circuit 160 are both started at the time t36, i.e. simultaneously. In the buffer control circuit 160, priority is given to transfer of the data input from the cache memory control circuit 150 farther from the core 111 in the mounting distance, so that the data item input from the cache memory control circuit 140 is stored in the buffer 30. After that, the data item to "BANK0" stored in the buffer 30 is transferred to the core 111 in four cycles after time t38.

Further, at the time t36, the core 111 gives a request (READ) for reading a data item in "BANK2", and at time t37 when the time of one cycle elapses after the time t36, the core 111 gives a request (READ) for reading the data item in "BANK0". The latency of "BANK2"→"CORE0" is larger than that of "BANK0"→"CORE0" by three cycles. The data read out from "BANK0" is input to the buffer control circuit 160 at an earlier time t40. This data is input to the core 111 without delay. At time t41 when the time of two cycles has elapsed after the time t40, the data read out from "BANK2" is input to the buffer control circuit 160. This data is stored in the buffer 30, and is then input to the core 111 in four cycles after time t42.

As described above, the number of times of transmission of data to the same core is limited to one for every eight cycles. Further, the number of times of transmission of data to cores sharing the same bus is limited to one for every four cycles. This makes it possible to perform data transfer via two channels using a core port for one channel, by mounting only one buffer having a cache block size per two cores.

The multi-core LSI 100 can be mounted on a system board of a computer or the like.

Figure 11:
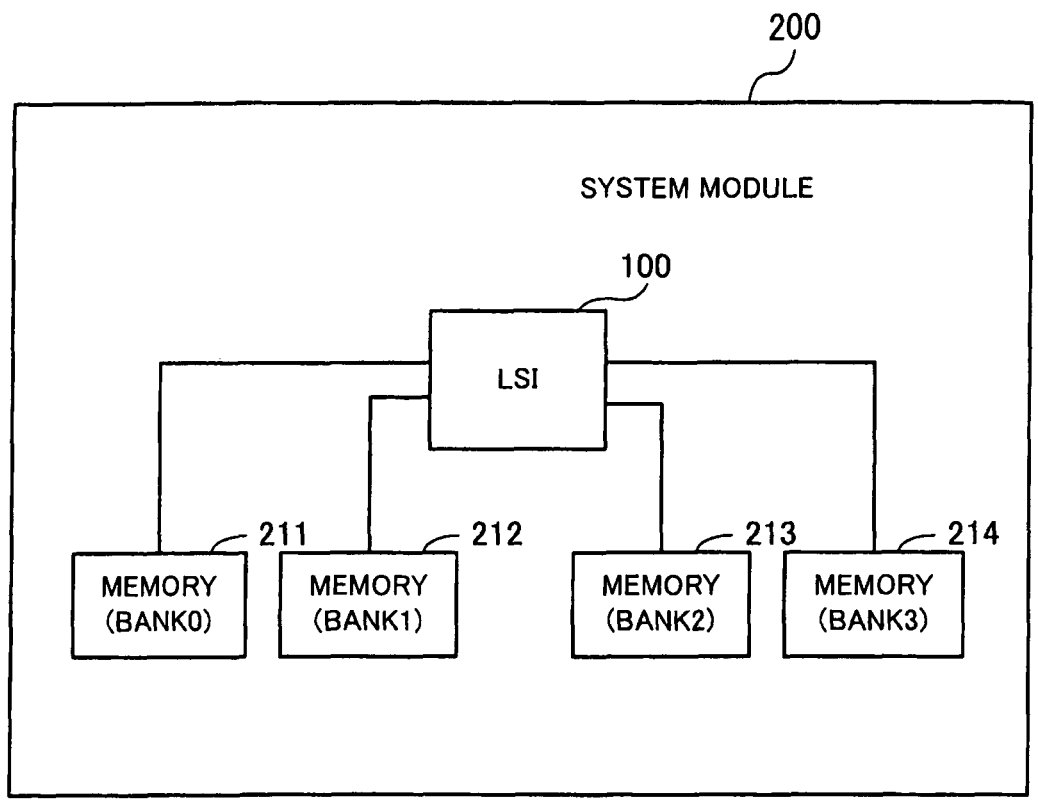
FIG. 11 illustrates an example of a system module having a multi-core LSI chip mounted thereon.

FIG. 11 illustrates an example of a system module having a multi-core LSI chip mounted thereon. The system module 200 has not only the LSI 100 but also memories 211 to 214 mounted thereon. The memories 211 to 214 serve as a main storage device of the system module 200. Program commands executed by the LSI 100, data for executing the program commands, and so forth are stored in the memories 211 to 214.

The memories 211 to 214 are associated with respective banks of the main storage device. In the example illustrated in FIG. 11, the memory 211 is associated with "BANK0", the memory 212 with "BANK1", the memory 213 with "BANK2", and the memory 214 with "BANK3". The memories 211 to 214 are connected to the main storage control circuits 131 to 134 provided in association with the respective banks in the LSI 100.

When no data item requested by the cores 111 to 118 exists within the data memories 121 to 124 in the LSI 100, which are used for the cache memory, the LSI 100 acquires the requested data item from the data memories 121 to 124.

As described hereinabove, in the LSI 100 according to the second embodiment, it is possible to efficiently acquire data by the cores 111 to 118 using a plurality of cache memory control circuits 140 and 150, while suppressing an increase in the chip size. More specifically, although efficient cache processing is performed using the cache memory control circuits 140 and 150, each core is required to be provided with only one data input port, thereby making it possible to suppress an increase in the size of the whole LSI 100.

Now, a description will be given of differences between a case where the buffer control is performed inside the cores and a case where the buffer control is performed outside the cores as in the second embodiment.

In the case where the buffer control is performed inside the cores, the following configuration is employed.

Each core secures a MIB when giving a request for data (move-in request) and performs writing in the MIB upon reception of a response to the request. The capacity of the MIB is 128 bytes×10 entries per core. To perform the buffer control inside each core, the core writes in the MIB via two ports. A logic circuit and its peripheral circuits for selecting data transferred from the two channels and writing the data in the MIB are provided on an entry-by-entry basis. This makes it inevitable to employ a circuit configuration more complicated than the buffer control circuit 160 illustrated in FIGS. 4 and 5 in the second embodiment. Such an increase in the number of the circuits inside the core has a larger influence on an increase in the size of the LSI chip as the number of cores increases.

Furthermore, it is necessary to provide data buses of two channels up to the MIB of the core. When noise caused by the wiring of the data buses is taken into account, it is difficult to wire the two channels in a very small area. This makes it necessary to secure a wiring area, which can cause an increase in the area of the LSI chip.

In the second embodiment, it is possible to perform the buffer control using relatively simple circuits as illustrated in FIGS. 4 and 5, thereby making it possible to suppress an increase in the size of the LSI chip, as compared with the buffer control performed inside each core. Moreover, a plurality of cores can share one buffer control circuit, and hence even when the buffer control circuit in the second embodiment is additionally mounted on the LSI chip, the influence thereof on an increase in the size of the LSI chip is very small.

Furthermore, it is only required that wiring is provided in one channel between the buffer control circuit and each core. If the wiring is provided in one channel, the problem of noise does not occur differently from the case where wiring is formed in two channels in a very small area, and hence it is possible to provide wiring in the very small area.

Further, according to the second embodiment, it is possible to minimize side effects caused by the buffer control.

First, let us consider a case in which no buffer control circuits are provided. In this case, e.g. a cycle in which each of a plurality of cache memory control circuits uses a bus to transfer a data item to a core is set to be long enough to dispense with the buffer control circuit. More specifically, data items are transferred to the core with intervals long enough to prevent occurrence of a conflict in the core. In this case, although the long intervals prevent occurrence of the conflict of data, waiting is caused even when no conflict occurs, which degrades latency of data transfer. The degradation of the latency results in the degraded performance of the LSI chip.

In the second embodiment, the degradation of the latency is suppressed by providing buffer control circuits. More specifically, in the second embodiment, when the cache memory control circuits transfer data to a core, there is no need to provide waiting time so as to avoid conflict of the transferred data in the core. Here, the term "latency" is intended to mean a time period between a time point when a request is issued and a time point when a response to the request is made. Therefore, even if some of data items are transferred after being stored in the buffer by the buffer control, it is not regarded that the latency is degraded, insofar as the data items are output from the cache memory control circuits without delay.

In the second embodiment, the cache memory control circuits inhibit continuously receiving requests depending on the buffering capability of each buffer control circuit. More specifically, the issuing of a request from the same core to the pipeline control circuit is limited to once every eight cycles. As for a throughput, this limitation of issuing requests can cause degradation of the performance. In the second embodiment, however, the cache memory is divided into banks using least-significant bits of requested memory addresses, and hence it is considered that access to each core equally occurs between the banks. Therefore, it seldom occurs that data transfer is performed in a one-sided manner from one of the data memories, and the degradation of performance resulting from the limitation of issuing requests from the same core is slight.

From the above, according to the second embodiment, it is possible to enhance data access efficiency by parallel caching of data items in a plurality of banks using a plurality of cache memory control circuits, while hardly causing side effects on the performance and minimizing an increase in the chip size.

Although in the above-described second embodiment, the multi-core LSI is employed as the LSI 100, by way of example, this is not limitative, but the LSI 100 can be similarly realized using only a single core if it is required to parallelize data transfer to the core.

Further, in the above-described second embodiment, the LSI 100 includes a cache memory divided into banks, by way of example, and therefore two cache memory control circuits transfer data to a core via different buses. However, the cache memory control circuit is an example of a memory control circuit which transfers data to a core in response to a request from the core. For example, there is a case where the LSI 100 includes no cache memory and data acquired from a main storage device is transferred to the core. In such a case, a main storage control circuit controls an inhibition time period over which continuous issuing of requests from the core is inhibited.

According to the above-described processor and the method of transferring data, it is possible to parallelize transfer of data to a processing section thereof while suppressing an increase in the chip size.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that various changes, substitutions and alterations could be made hereto without departing from the spirit and scope of the invention.

What is claimed is:

1. A processor comprising:
a plurality of processing sections that outputs a first request and a second request;
a first memory controller that receives the first request from the plurality of processing sections;
a second memory controller that receives the second request from the plurality of processing sections;
a first memory that is connected to the first memory controller and controlled by the first memory controller to output first data via a first bus associated with the first request;
a second memory that is connected to the second memory controller and controlled by the second memory controller to output second data via a second bus associated with the second request; and
a buffer controller that includes a buffer and is connected to the first memory via the first bus and the second memory via the second bus, and transfers the first data or the second data which is transferred over a greater distance than the other data to a processing section, stores the first data or the second data which is not transferred in the buffer, and transfers the first data or the second data stored in the buffer to the processing section after termination of transferring the first data or the second data which is greater in data transfer distance than the other data, when outputting of the first data from the first memory and outputting of the second data from the second memory are performed simultaneously;
wherein:
during transfer of data outputted via one of the first bus and the second bus to a processing section, the buffer controller stores data outputted via the other of the first and second bus; and
the first and second busses connect to the plurality of processing sections, respectively, and when one of the first and second memory controllers receives an associated one of the first and second requests from one of the plurality of processing sections, the one of the first and second memory controller terminates receiving a request from any of the processing sections connected to a same bus as one of the first and second buses connected to the one of the plurality of processing sections which has outputted the request for a predetermined time period.

2. The processor according to claim 1,
wherein the plurality of processing sections are connected to the buffer controller, and the buffer controller dispatches the first data outputted from the first memory and the second data outputted from the second memory to at least one of the plurality of processing sections.

3. The processor according to claim 1, wherein the first memory controller sets a time period obtained by multiplying the time period taken to perform a transfer of the first data from the buffer controller to the processing section by a number of buses as the predetermined time period.

4. The processor according to claim 1, wherein the buffer of the buffer controller has a storage capacity corresponding to an amount of data transferred per data transfer.

5. The processor according to claim 1, wherein the first memory controller sets a time period taken to perform a data transfer from the buffer controller to the one of the plurality of processing sections as the predetermined time period.

6. A data transfer method for a processor having a buffer controller that includes a buffer, the data transfer method comprising:
outputting a first request and a second request from a plurality of processing sections of the processor;
receiving the first request from the plurality of processing sections by a first memory controller of the processor;
receiving the second request from the plurality of processing sections by a second memory controller of the processor;
outputting first data associated with the first request via a first bus from a first memory connected to the first memory controller;
outputting second data associated with the second request via a second bus from a second memory connected to the second memory controller;
transferring the first data or the second data which is transferred over a greater distance than the other data to a processing section, storing the first data or the second data which is not transferred in the buffer; and transferring the first data or the second data stored in the buffer to the processing section after termination of transferring of the first data or the second data which is greater in data transfer distance than the other data by the buffer controller is connected to the first memory via the first bus and the second memory via the second bus, when outputting of the first data from the first memory and outputting of the second data from the second memory are performed simultaneously;
wherein:
during transfer of data outputted via one of the first bus and the second bus to a processing section, the buffer controller stores data outputted via the other of the first and second bus; and
the first and second busses connect to the plurality of processing sections, respectively, and when one of the first and second memory controllers receives an associated one of the first and second requests from one of the plurality of processing sections, the one of the first and second memory controller terminates receiving a request from any of the processing sections connected to a same bus as one of the first and second buses connected to the one of the plurality of processing sections which has outputted the request for a predetermined time period.

7. The data transfer method according to claim 6, wherein the plurality of processing sections are connected to the buffer controller, and the buffer controller dispatches the first data output from the first memory and the second data output from the second memory to at least one of the plurality of processing sections.

8. The data transfer method according to claim 6, wherein the first memory controller sets at least a time period taken to transfer the first data from the buffer controller to the processing section as the predetermined time period.

* * * * *